US011822146B2

United States Patent
Ready

(10) Patent No.: US 11,822,146 B2
(45) Date of Patent: Nov. 21, 2023

(54) FAST STEERING MONOLITHIC DUAL AXIS MIRROR AND METHOD FOR MANUFACTURING

(71) Applicant: Raytheon Company, Waltham, MA (US)

(72) Inventor: Richard Joseph Ready, Flower Mound, TX (US)

(73) Assignee: Raytheon Company, Waltham, MA (US)

( * ) Notice: Subject to any disclaimer, the term of this patent is extended or adjusted under 35 U.S.C. 154(b) by 183 days.

(21) Appl. No.: 17/179,126

(22) Filed: Feb. 18, 2021

(65) Prior Publication Data
US 2022/0260805 A1 Aug. 18, 2022

(51) Int. Cl.
*G02B 7/182* (2021.01)
*F16M 11/12* (2006.01)
*F16M 11/20* (2006.01)

(52) U.S. Cl.
CPC ......... *G02B 7/1827* (2013.01); *F16M 11/123* (2013.01); *F16M 11/205* (2013.01)

(58) Field of Classification Search
CPC ... G02B 7/1827; F16M 11/123; F16M 11/205
USPC .......... 359/224.1, 196.1, 577, 515, 838, 904
See application file for complete search history.

(56) References Cited

U.S. PATENT DOCUMENTS

| | | | | |
|---|---|---|---|---|
| 3,575,475 A * | 4/1971 | Boerner | ................. | F16D 3/005 403/291 |
| 4,286,370 A * | 9/1981 | Craig | ..................... | F16C 11/12 403/291 |
| 4,592,242 A * | 6/1986 | Kempas | ................. | G01C 19/22 403/119 |
| 6,146,044 A * | 11/2000 | Calvet | ..................... | F16C 11/12 403/291 |
| 8,274,722 B2 * | 9/2012 | Moidu | ............... | G02B 26/0841 359/224.1 |
| 2002/0074310 A1 * | 6/2002 | Dewa | ................. | G02B 26/0833 216/22 |
| 2010/0067980 A1 * | 3/2010 | Kibel | ..................... | G02B 7/003 403/291 |
| 2018/0209475 A1 * | 7/2018 | Balaban | ................. | F16D 3/005 |

(Continued)

OTHER PUBLICATIONS

Gallagher et al., U.S. Appl. No. 16/228,368 titled "Dual-Axis Flexure Gimbal Device" and filed Dec. 20, 2018, 70 pgs.

(Continued)

*Primary Examiner* — Ricky L Mack
*Assistant Examiner* — Sharrief I Broome

(57) ABSTRACT

A method includes fabricating a mirror system that includes a dual axis gimbal, a mirror, and a mirror substrate that are formed together as an integral component using an additive manufacturing process. The method also includes forming multiple first gaps in the mirror system using a subtractive manufacturing process, where the first gaps extend through the mirror system in a first direction. The method further includes forming multiple second gaps in the mirror system using the subtractive manufacturing process, where the second gaps extend through the mirror system in a second direction perpendicular to the first direction. The first gaps and the second gaps separate the gimbal into a top portion and a bottom portion.

20 Claims, 10 Drawing Sheets

(56) References Cited

U.S. PATENT DOCUMENTS

2018/0252261 A1* 9/2018 Bullard .................. F16C 11/12
2020/0200211 A1    6/2020 Gallagher et al.

OTHER PUBLICATIONS

Ready et al., U.S. Appl. No. 16/592,300 titled "Monolithic Gimbal for a Fast Steering Mirror" and filed Oct. 3, 2019, 23 pgs.

* cited by examiner

FAST STEERING MONOLITHIC DUAL AXIS MIRROR AND METHOD FOR MANUFACTURING

TECHNICAL FIELD

This disclosure is generally directed to optical systems. More specifically, this disclosure is directed to a fast steering monolithic dual axis mirror and a method for manufacturing.

BACKGROUND

Some designs for fast steering mirrors include a flexure type gimbal for low friction, high repeatability, and good stiffness. Such designs typically include multiple parts fastened together through different processes, usually including one or more bonding processes. For example, a gimbal may be bonded to a mirror. Many of the parts are commercially available with limited size and load options. Some of the parts, such as gimbal components, may be particularly fragile. In addition, the overall design includes disparate materials that have different coefficient of thermal expansion (CTE) values, which can lead to wavefront errors in the mirror operation.

SUMMARY

This disclosure provides a fast steering monolithic dual axis mirror and a method for manufacturing.

In a first embodiment, a method includes fabricating a mirror system that includes a dual axis gimbal, a mirror, and a mirror substrate that are formed together as an integral component using an additive manufacturing process. The method also includes forming multiple first gaps in the mirror system using a subtractive manufacturing process, where the first gaps extend through the mirror system in a first direction. The method further includes forming multiple second gaps in the mirror system using the subtractive manufacturing process, where the second gaps extend through the mirror system in a second direction perpendicular to the first direction. The first gaps and the second gaps separate the gimbal into a top portion and a bottom portion.

In a second embodiment, a mirror system includes a dual axis gimbal, a mirror, and a mirror substrate. The gimbal, the mirror, and the mirror substrate represent an integral component formed using an additive manufacturing process. The mirror system includes multiple first gaps extending through the mirror system in a first direction and multiple second gaps extending through the mirror system in a second direction perpendicular to the first direction, where the first and second gaps separate the gimbal into a top portion and a bottom portion. The first and second gaps are formed in the mirror system using a subtractive manufacturing process.

In a third embodiment, a mirror system includes a dual axis gimbal, a mirror having a reflective surface, and a mirror substrate having multiple recesses, where the recesses are configured to contain actuators for controlling movement of the gimbal. The gimbal, the mirror, and the mirror substrate represent an integral component formed using an additive manufacturing process. The mirror system includes multiple first gaps extending through the mirror system in a first direction and multiple second gaps extending through the mirror system in a second direction perpendicular to the first direction, where the first and second gaps separate the gimbal into a top portion and a bottom portion. The first and second gaps are formed in the mirror system using a subtractive manufacturing process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
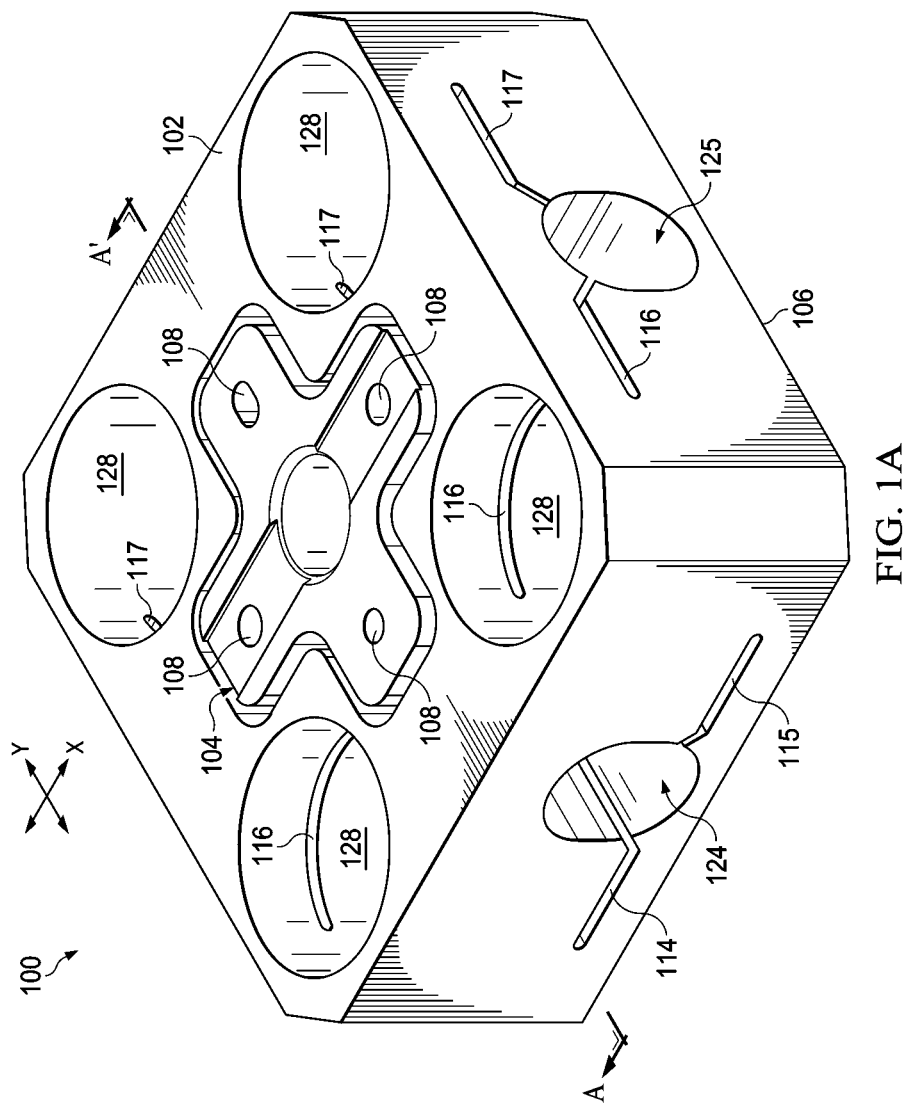
FIGS. 1A through 1E illustrate an example monolithic mirror system according to this disclosure.

FIGS. 1A through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, some designs for fast steering mirrors include a flexure type gimbal for low friction, high repeatability, and good stiffness. Such designs typically include multiple parts fastened together through different processes, usually including one or more bonding processes. For example, a gimbal may be bonded to a mirror. Many of the parts are commercially available with limited size and load options. Some of the parts, such as gimbal components, may be particularly fragile. In addition, the overall design includes disparate materials that have different coefficient of thermal expansion (CTE) values, which can lead to wavefront errors in the mirror operation. For example, some previous designs include a gimbal formed using steel and a mirror formed using beryllium. Currently, no mirror system exists that has a gimbal and flexure features integrally built into the mirror system or internally machined within.

This disclosure provides a mirror system with integrated gimbal and flexure features, where all components are manufactured together as a monolithic unit. That is, the gimbal and flexure features are formed as part of the mirror system, which eliminates the need for joining multiple parts together with fastening methods. As described in greater detail below, the mirror system can be fabricated using one or more additive manufacturing techniques. Additional fabrication operations can also be performed using one or more subtractive manufacturing techniques, such as wire electrical discharge machining (EDM). The integral design and manufacturing approach for the mirror system makes its overall stiffness highly tunable. Also, the overall geometry of the mirror system significantly reduces the likelihood of damage during handling. Note that while this disclosure is described with respect to fast steering dual axis mirrors, it will be understood that the principles disclosed here are also applicable to other types of manufactured systems. The disclosed embodiments can be used in conjunction with various applications that use fast steering mirrors, including aircraft, ground vehicles, defense applications, and the like.

Figure 1B:
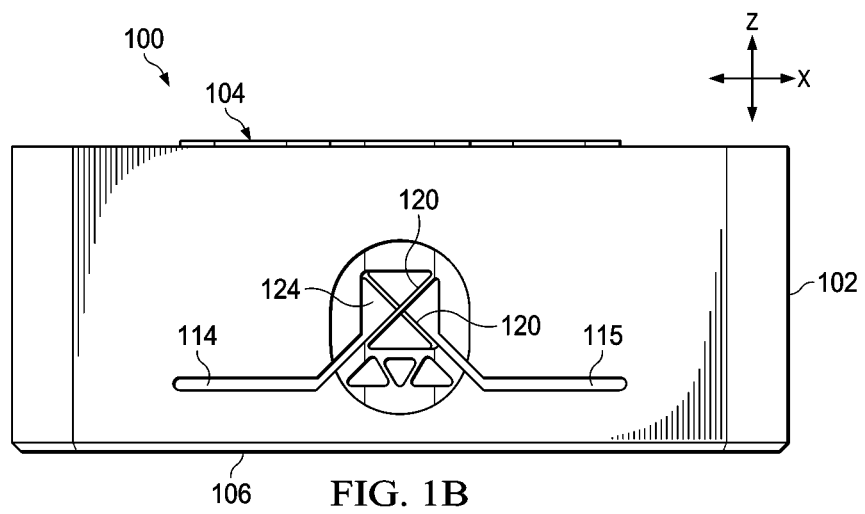
Figure 1C:
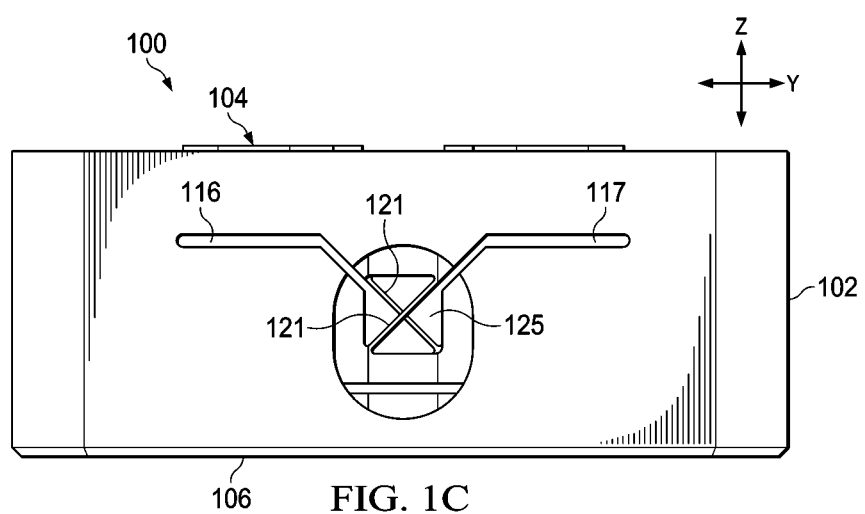
Figure 1D:
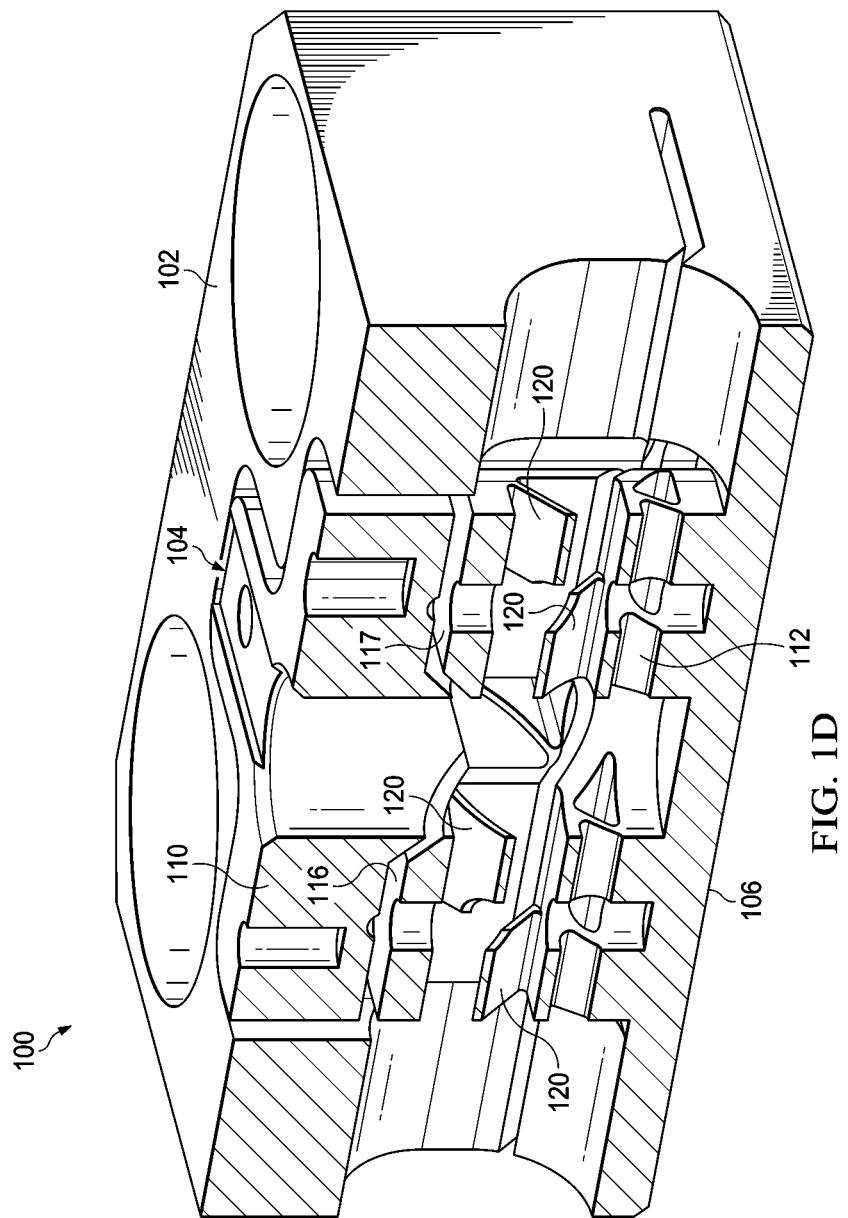
Figure 1E:
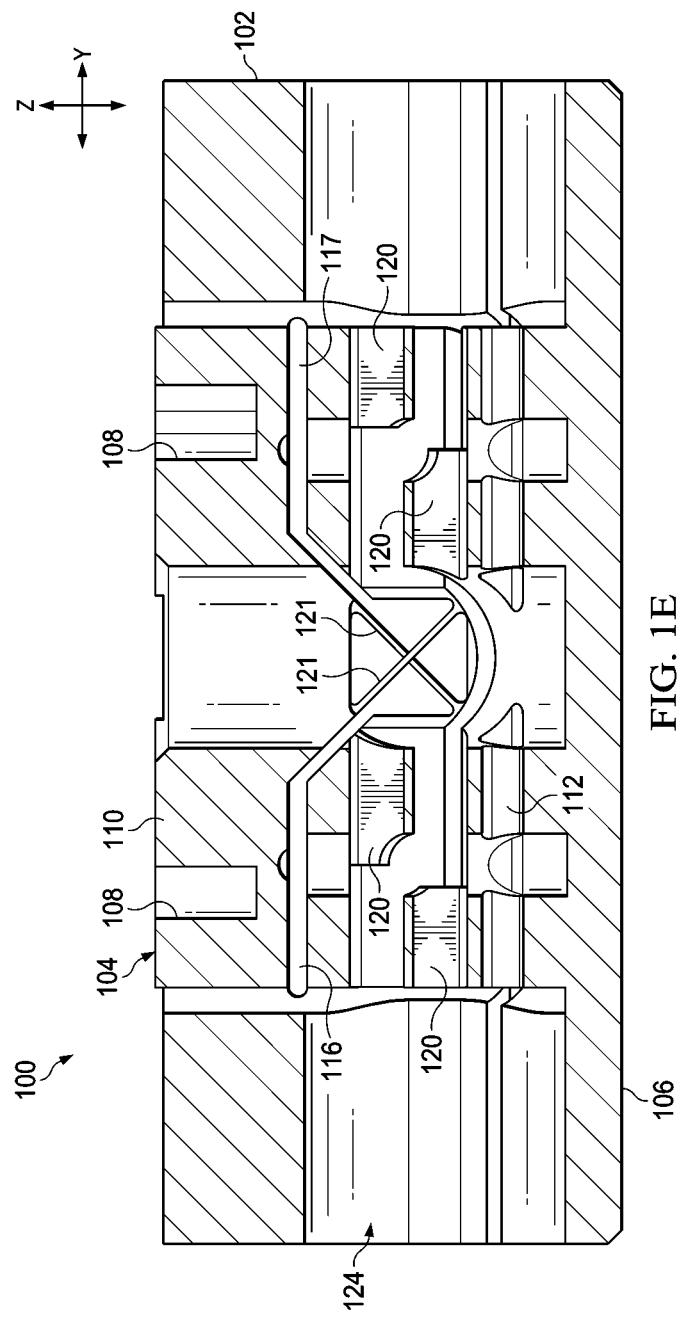

FIGS. 1A through 1E illustrate an example monolithic mirror system 100 according to this disclosure. In particular, FIG. 1A illustrates a perspective view of the mirror system 100, FIGS. 1B and 1C illustrate side views of the mirror system from different sides, and FIGS. 1D and 1E illustrate cross-sectional views of the mirror system 100 taken along a line A-A' in FIG. 1A.

As shown in FIGS. 1A through 1E, the mirror system 100 includes a mirror substrate 102, a gimbal 104, and a mirror 106. Note, however, that other combinations and arrangements of components may also be used here. The mirror substrate 102, the gimbal 104, and the mirror 106 are fabricated together as a monolithic, integral unit using a common manufacturing process. As a result, the mirror substrate 102, the gimbal 104, and the mirror 106 are formed together without any joining elements, bonding elements, fasteners, seams, or assembly operations. In some embodiments, the mirror substrate 102, the gimbal 104, and the mirror 106 are fabricated together using an additive manufacturing process, such as three-dimensional (3D) printing.

The mirror substrate 102, the gimbal 104, and the mirror 106 are formed using a common material or combination of materials. For example, in some embodiments, the mirror substrate 102, the gimbal 104, and the mirror 106 may be formed using aluminum, titanium, another suitable metallic or non-metallic element (such as one or more rigid plastics), or a combination of any of these. In particular embodiments, the mirror substrate 102, the gimbal 104, and the mirror 106 are formed using an alloy, and a portion of the alloy (such as about 10% by weight) can include silicon.

The mirror substrate 102 surrounds the gimbal 104 and provides a supportive structure for the mirror 106. The mirror substrate 102 also includes multiple recesses 128 into which various other components (such as electronics, actuators, or the like) can be placed for controlling movement of the gimbal 104. While the mirror substrate 102 is shown in FIG. 1A as having four recesses 128, this is merely one example, and other embodiments may include other numbers of recesses 128. Additionally or alternatively, the mirror substrate 102 may include other structures or components for controlling movement of the gimbal 104.

The mirror 106 is disposed on an exterior surface of the mirror substrate 102 and includes a reflective surface. Due to the orientation of the mirror system 100 in FIGS. 1A through 1E, the reflective surface of the mirror 106 is not actually shown in the figures. Instead, the location of the mirror 106 is indicated in the figures. In some embodiments, the mirror 106 represents a fast steering mirror.

The gimbal 104 is a dual axis gimbal that is connected to the back side of the mirror 106 and is configured to enable tip and tilt of the mirror 106 for image motion compensation. As used here, tilt and tip refer to rotation of the mirror 106 around an X axis and a Y axis respectively, which are identified in the figures. As a point of reference, the reflective surface of the mirror 106 is substantially disposed in an X-Y plane. The Z axis is perpendicular to the X and Y axes and to the reflective surface of the mirror 106 (assuming the reflective surface is flat, which is not necessarily required). In this patent document, the X, Y, and Z axes are provided for frame of reference in the mirror system 100 and are not to be interpreted as specific directions relative to objects that are not part of the mirror system 100. The gimbal 104 can be shaped and sized to enable a desired amount of tip and tilt. As will be described in greater detail below, the gimbal 104 includes a custom flexure pivot structure that includes tip/tilt limiting features.

The gimbal 104 is generally in the shape of a cross or "X" in cross section. As best illustrated in FIG. 1E, the gimbal 104 includes a "top" portion 110 and a "bottom" portion 112 that are separated by gaps 114-117. The bottom portion 112 is integrally formed with the mirror 106. The gaps 114-117 provide space for tip and tilt movement of the bottom portion 112 (and the mirror 106) relative to the top portion 110. The gaps 114 and 115 pass completely through the mirror system 100 (including the gimbal 104) in the Y axis direction, and the gaps 116 and 117 pass completely through the mirror system 100 (including the gimbal 104) in the X axis direction. As shown in FIG. 1B, the gaps 114-115 begin in a middle portion of the mirror system 100 and extend "downward" and outward at an angle and then extend outward generally parallel to the mirror 106. As shown in FIG. 1C, the gaps 116 and 117 begin in the middle portion of the mirror system 100 and extend "upward" and outward at an angle and then extend outward generally parallel to the mirror 106. In some embodiments, the gaps 114-117 have a thickness dimension between the top portion 110 and the bottom portion 112 of approximately 0.03 inches (about 0.762 millimeters), although other embodiments may include gaps having other thicknesses. In this patent document, the terms "top," "bottom," "upward," and "downward" are used for frame of reference in the drawings and are not to be interpreted as specific orientations of the gimbal 104 or any other component of the mirror system 100.

Multiple mounting holes 108 are located on one surface of the top portion 110 of the gimbal 104 opposite the mirror 106. The mounting holes 108 are provided to secure the gimbal 104 to a support structure, base structure, substrate, or the like. In some embodiments, the mounting holes 108 can include screw threads or other suitable components to receive screw fasteners to secure the gimbal 104 to the support structure. In the mirror system 100, the gimbal 104 includes four mounting holes 108, although other embodiments may include other numbers of mounting holes 108.

The gimbal 104 includes a custom flexure pivot structure that connects the top portion 110 and the bottom portion 112 of the gimbal 104. The flexure pivot structure is such that the bottom portion 112 is movable relative to the top portion 110 in the X-axis and Y-axis directions to enable the tip and tilt described here. The gaps 114 and 115 limit the amount of tip, while the gaps 116 and 117 limit the amount of tilt. The flexure pivot structure includes multiple flexure blades 120 and 121. The flexure blades 120 and 121 connect the top portion 110 and the bottom portion 112 of the gimbal 104. Each flexure blade 120 and 121 is capable of bending slightly to allow relative movement between the top portion 110 and the bottom portion 112.

As best shown in FIGS. 1D and 1E, the flexure blades 120 are arranged in different locations substantially along a line extending in the Y axis direction, while the flexure blades 121 are arranged in different locations substantially along a line extending in the X axis direction. In some embodiments, the flexure blades 120 include two pairs of blades that are oriented perpendicular to each other. All of the flexure blades 120 can be formed at an angle of about 45° relative to the Y axis as shown in the figures. When the flexure blades 120 bend, the bottom portion 112 of the gimbal 104 rotates or tips around the Y axis relative to the top portion 110. Similarly, the flexure blades 121 can also include two pairs of blades that are oriented perpendicular to each other. All of the flexure blades 121 can be formed at an angle of about 45° relative to the X axis as shown in the figures.

As shown in FIG. 1B, the flexure blades 120 are formed in a void (open space) 124 that extends in the Y axis direction completely through the mirror system 100. Similarly, as shown in FIG. 1C, the flexure blades 121 are formed in a void 125 that extends in the X axis direction completely through the mirror system 100. In some embodiments, the voids 124 and 125 are created during the additive manufacturing process as material forming the mirror system 100 is incrementally added around the voids 124 and 125. In other embodiments, the voids 124 and 125 are created after the additive manufacturing process, such as by etching or using another subtractive manufacturing process. As discussed in greater detail below, the voids 124 and 125 allow tool access all the way through the mirror system 100 in order to create the gaps 114-117 using a subtractive manufacturing process.

When the flexure blades 121 bend, the bottom portion 112 of the gimbal 104 rotates or tilts around the X axis relative to the top portion 110. All of the flexure blades 120 and 121 may be integrally formed with the mirror system 100 during the additive manufacturing process. While the gimbal 104 includes two pairs of flexure blades 120 in the Y direction and two pairs of flexure blades 121 in the X direction, this is merely one example. Other embodiments may include different numbers of flexure blades 120 and 121, and the number of flexure blades in each direction does not have to be the same.

Figure 2A:
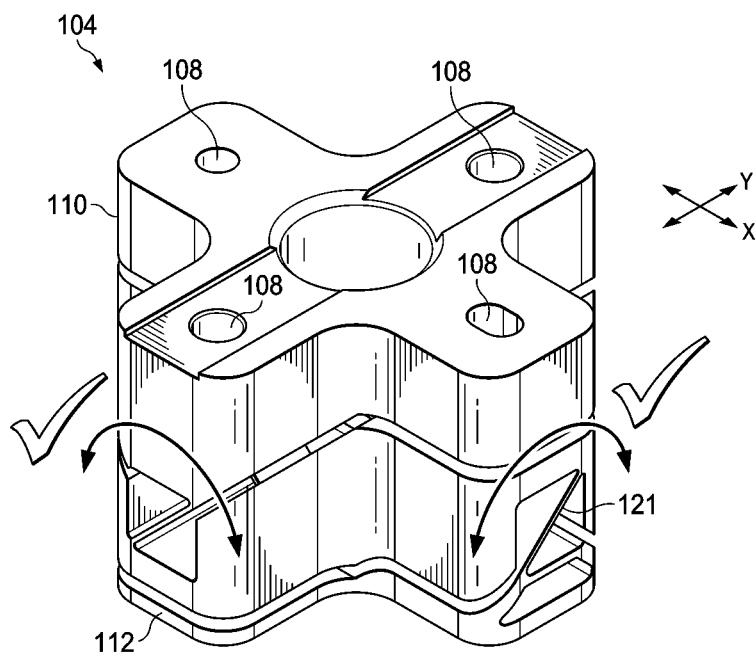
FIGS. 2A and 2B illustrate various degrees of freedom of movement of a gimbal in the mirror system of FIGS. 1A through 1E according to this disclosure.
Figure 2B:
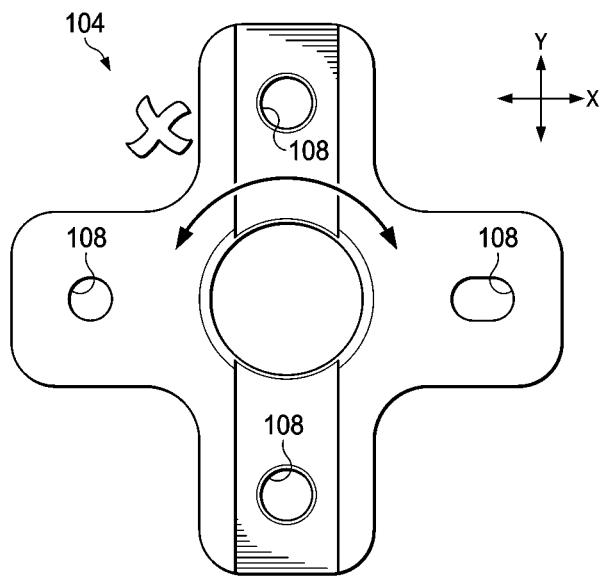

FIGS. 2A and 2B illustrate various degrees of freedom of movement of the gimbal 104 in the mirror system 100 according to this disclosure. In FIGS. 2A and 2B, the gimbal 104 is shown in isolation, separate from the mirror substrate 102 and the mirror 106. This is merely for clarity of explanation of features of the gimbal 104. As discussed here, in actual implementations, the gimbal 104 is integrally connected to both the mirror substrate 102 and the mirror 106 in the mirror system 100.

As shown in FIG. 2A, the top portion 110 of gimbal 104 is configured to tip and tilt, which respectively involve rotation about the X axis and the Y axis (as indicated by the checkmarks in the figure) relative to the bottom portion 112 of the gimbal 104. Tip and tilt movement can be achieved by an external force on the gimbal 104, such as by one or more actuators (not shown), which can be disposed in the recesses 128. The amount of tip and tilt that the gimbal 104 can perform is limited by thickness of the gaps 114-117. That is, as the top portion 110 tips or tilts toward the bottom portion 112, at least one of the gaps 114-117 shrinks until that gap 114-117 is closed and edges of the top portion 110 and the bottom portion 112 touch. Thus, the gaps 114-117 act as a constraint on the amount of tip and tilt movement and can also act as a damage-limiting feature by preventing the flexure blades 120 and 121 from bending to the point of damage. As shown in FIG. 2B, the arrangement of the flexure blades 120 and 121 restricts the gimbal 104 from rotation about the Z axis (as indicated by the "X" or "restricted" symbol in the figure). Moreover, the arrangement of the flexure blades 120 and 121 restricts the gimbal 104 from lateral or translational movement in any of the X, Y, or Z directions.

Figure 3A:
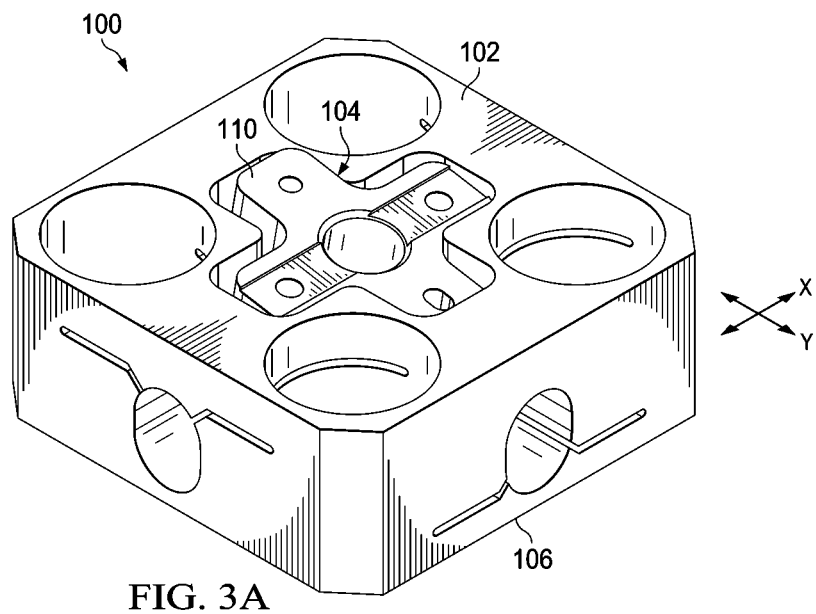
FIGS. 3A and 3B illustrate tip and tilt movements of the gimbal in the mirror system of FIGS. 1A through 1E according to this disclosure.
Figure 3B:
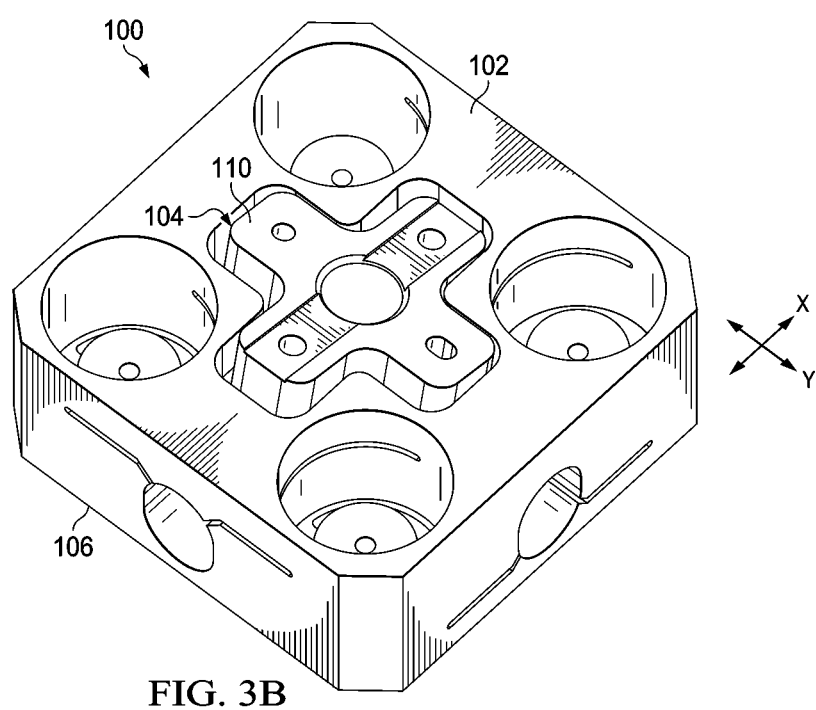

FIGS. 3A and 3B illustrate tip and tilt movements of the gimbal 104 in the mirror system 100 according to this disclosure. As shown in FIG. 3A, the top portion 110 of the gimbal 104 is tilted around the X axis relative to the bottom portion 112 of the gimbal 104 and other portions of the mirror system 100, including the mirror 106. As shown in FIG. 3B, the top portion 110 of the gimbal 104 is tipped around the Y axis relative to the bottom portion 112 of the gimbal 104 and other portions of the mirror system 100, including the mirror 106. The amount of tip and tilt shown in FIGS. 3A and 3B (the rotational range) is more than 10°, which promotes clarity in the figures, but is likely larger than the amount of tip or tilt in most implementations. In actual implementations, the amount of tip or tilt may be on the order of a few milliradians. Of course, different amounts of tip and tilt are possible in different embodiments, and the thicknesses of the gaps 114-117 are customizable to limit the amounts of tip and tilt, depending on application and desired rotational range. Also, in actual implementations, the top portion 110 of the gimbal 104 would likely be attached to a base structure (not shown), such as a housing of a sensor assembly. In such implementations, the base structure would be considered to be in a fixed position relative to the mirror system 100. Thus, the bottom portion 112 of the gimbal 104, the mirror 106, and other portions of the mirror system 100 would be considered to tip or tilt relative to the top portion 110 of the gimbal 104 and the base structure.

Figure 4A:
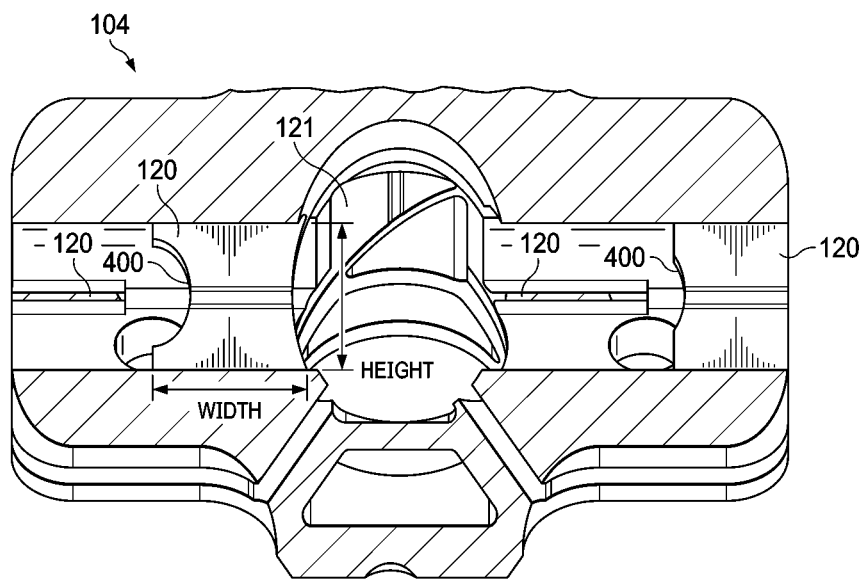
FIGS. 4A and 4B illustrate example designs of flexure blades in the gimbal according to this disclosure.
Figure 4B:
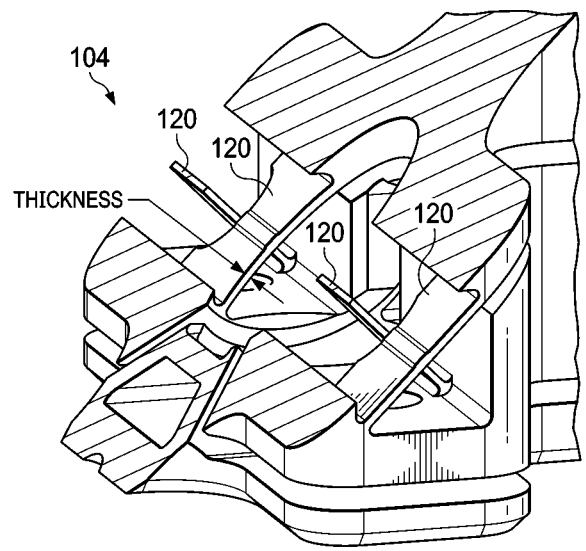

FIGS. 4A and 4B illustrate example designs of the flexure blades 120 and 121 in the gimbal 104 according to this disclosure. As shown in FIGS. 4A and 4B, each flexure blade 120 and 121 can have a height, width, thickness, and overall shape that can selected to obtain desired performance, stiffness, and strength characteristics. In some embodiments, the height, width, thickness, and shape of each flexure blade 120 and 121 can be achieved during the additive manufacturing process, meaning the flexure blades 120 and 121 can be manufactured having the desired characteristics during the additive manufacturing process. In other embodiments, one or more portions of one or more flexure blades 120 and 121 can be removed by a subtractive manufacturing process (such as wire EDM) in order to achieve a final shape or size. For example, as shown in FIG. 4A, some of the flexure blades 120 include an indention 400 along one or more sides. Each indention 400 can be formed by the subtractive manufacturing process after formation of the flexure blades 120.

Figure 5A:
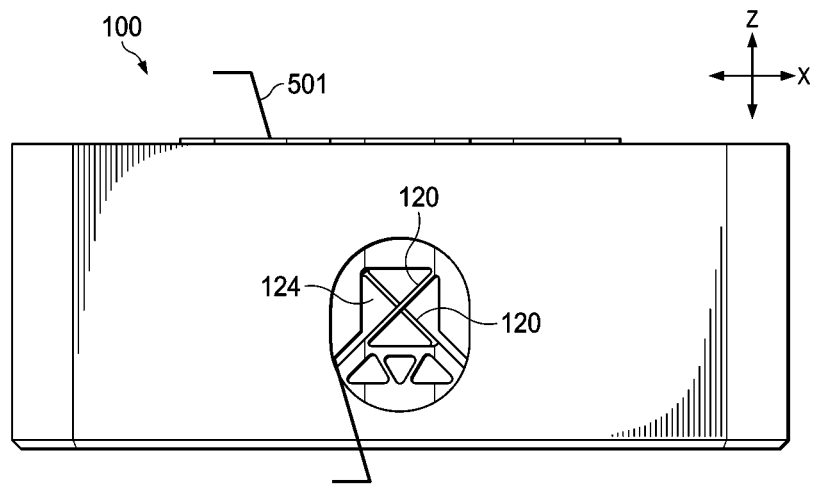
FIGS. 5A through 5D illustrate examples of the mirror system of FIGS. 1A through 1E before and after a subtractive manufacturing process according to this disclosure.
Figure 5B:
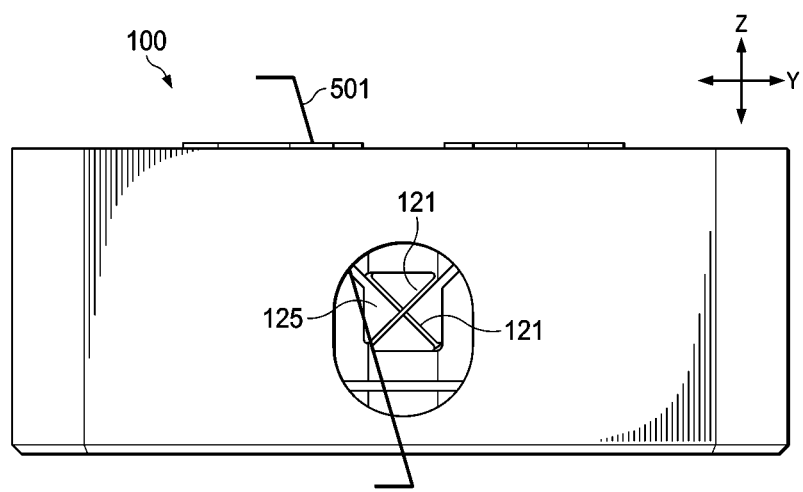
Figure 5C:
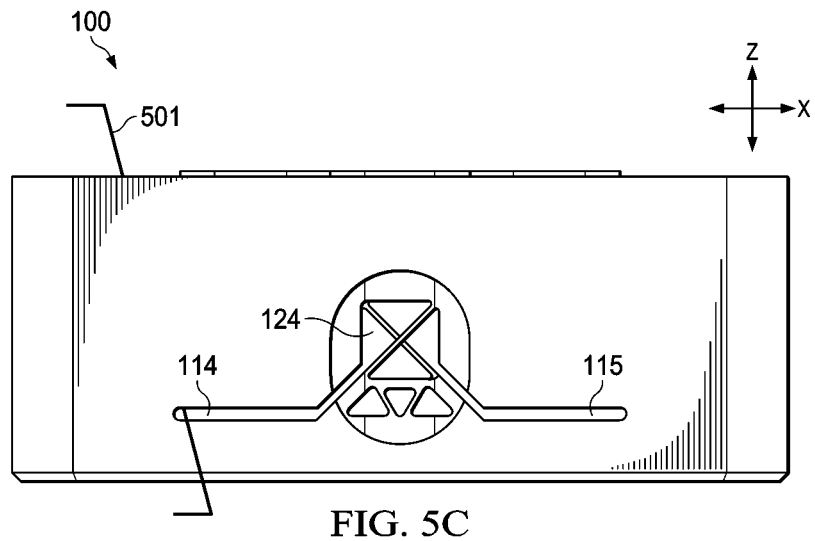
Figure 5D:
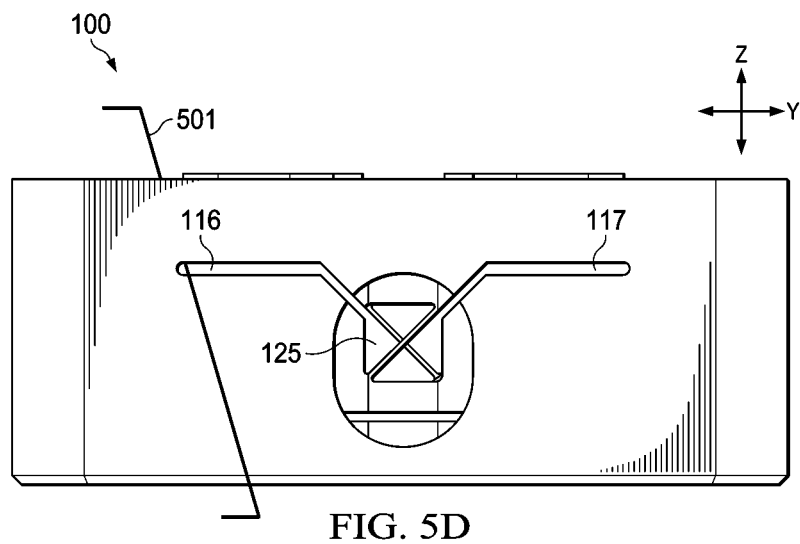

FIGS. 5A through 5D illustrate examples of the mirror system 100 before and after a subtractive manufacturing process according to this disclosure. In particular, FIGS. 5A and 5B show different side views of the mirror system 100 near the start of the subtractive manufacturing process, and FIGS. 5C and 5D show the same side views of the mirror system 100 after the subtractive manufacturing process. As shown in FIGS. 5A and 5B, the mirror system 100 has been integrally formed, such as by using an additive manufacturing process. As shown in FIG. 5A, the mirror system 100 includes the flexure blades 120 formed in the Y axis direction in the void 124. As shown in FIG. 5B, the mirror 100 includes the flexure blades 121 formed in the X axis direction in the void 125.

A subtractive manufacturing tool 501 (such as a wire for use in wire EDM) is placed through the void 124 in the Y axis direction and is drawn downward and outward and then straight outward. As the tool 501 is moved, the tool 501 removes portions of the mirror system 100 to form the gap 114 as shown in FIG. 5C. The tool 501 is again placed through the void 124 in the Y axis direction and is drawn downward and outward in the other direction to form the gap 115 as shown in FIG. 5C. Likewise, as shown in FIG. 5B, the tool 501 is placed through the void 125 in the X axis direction and is drawn upward and outward. As the tool 501 is moved, the tool 501 removes portions of the mirror system 100 to form the gap 116 as shown in FIG. 5D. The tool 501 is again placed through the void 125 in the X axis direction and is drawn upward and outward in the other direction to form the gap 117 as shown in FIG. 5C.

In addition to using the tool 501 to form the gaps 114-117, the tool 501 can be used to shape and separate the flexure blades 120 and 121. For example, the tool 501 can be used to reduce the thickness or width or change the overall shape of any of the flexure blades 120 and 121. These changes can be performed to adapt the flexure blades 120 and 121 as needed for desired performance.

Although FIGS. 1A through 5D illustrates one example of a mirror system 100 and related details, various changes may be made to FIGS. 1A through 5D. For example, while the subtractive manufacturing process has been described as involving the use of wire EDM, any other suitable subtractive manufacturing process can be used. Also, various components in the mirror system 100 may be combined, further subdivided, replicated, rearranged, or omitted and additional components may be added according to particular needs. In addition, while FIGS. 1A through 5D illustrate one example system in which additive and subtractive manufacturing techniques can be used, this functionality may be used in any other suitable device or system.

Figure 6:
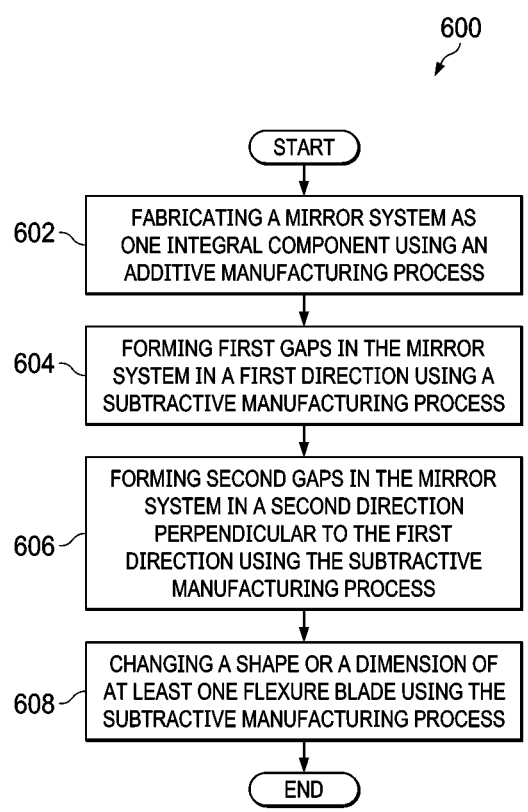
FIG. 6 illustrates an example method for manufacturing a mirror system with dual axis gimbal and mirror according to this disclosure.

FIG. 6 illustrates an example method 600 for manufacturing a mirror system with dual axis gimbal and mirror according to this disclosure. For ease of explanation, the method 600 is described as being performed to manufacture the mirror system 100 of FIGS. 1A through 1E. However, the method 600 may be used to manufacture any other suitable mirror system designed according to the teachings of this disclosure.

As shown in FIG. 6, a mirror system including a dual axis gimbal, a mirror, and a mirror substrate is fabricated at step 602. The gimbal, mirror, and mirror substrate are formed together as an integral component using an additive manufacturing process. This may include, for example, using 3D printing or another suitable additive manufacturing process to integrally form the gimbal 104, the mirror 106, and mirror substrate 102. In some embodiments, the gimbal includes multiple first flexure blades arranged substantially along a first line extending in a first direction and multiple second flexure blades arranged substantially along a second line extending in a second direction perpendicular to the first direction.

Multiple first gaps in the mirror system are formed using a subtractive manufacturing process at step 604, where the first gaps extend through the mirror system in the first direction. This may include, for example, using wire EDM or another suitable subtractive manufacturing process to form the gaps 114 and 115. In some embodiments, the first gaps are formed by placing a subtractive manufacturing tool through a first void in the mirror system and moving the subtractive manufacturing tool along shapes of the first gaps. The first void extends through the mirror system in the first direction.

Multiple second gaps in the mirror system are formed using the subtractive manufacturing process at step 606, where the second gaps extend through the mirror system in the second direction. This may include, for example, using wire EDM to form the gaps 116 and 117. In some embodiments, the second gaps are formed by placing the subtractive manufacturing tool through a second void in the mirror system and moving the subtractive manufacturing tool along shapes of the second gaps. The second void extends through the mirror system in the second direction. The first gaps and the second gaps separate the gimbal into a top portion and a bottom portion. The first gaps and the second gaps also allow tip and tilt movement of the bottom portion of the gimbal and the mirror relative to the top portion of the gimbal.

In some embodiments, a shape or a dimension of at least one of the first or second flexure blades is optionally changed using the subtractive manufacturing process at step 608. This may include, for example, using wire EDM to change a shape or a dimension of one or more flexure blades 120 and 121.

Although FIG. 6 illustrates one example of a method 600 for manufacturing a mirror system with dual axis gimbal and mirror, various changes may be made to FIG. 6. For example, while shown as a series of steps, various steps in FIG. 6 may overlap, occur in parallel, occur in a different order, or occur any number of times.

The disclosed embodiments provide an advantageous mirror system and method of manufacturing thereof. The disclosed embodiments include a compact configuration and simpler fabrication process. Compared to existing mirror systems, the disclosed embodiments simplify a multiple part assembly (which often containing two to fifteen parts or more) to a single monolithic structure. This eliminates various assembling operations and also eliminates the need for a bonding operation between the gimbal and the mirror. Also, since all material of the mirror system may have substantially the same CTE value, there is less uncertainty on wavefront error. The use of additive and subtractive manufacturing processes as disclosed here allow customization and more design flexibility in the completed mirror system, compared to the use of commercially available parts.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document.

The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    fabricating a mirror system comprising a dual axis gimbal, a mirror, and a mirror substrate that are formed together as an integral component using an additive manufacturing process;
    forming multiple first gaps in the mirror system using a subtractive manufacturing process, the first gaps extending completely through the gimbal and the mirror substrate in a first direction; and
    forming multiple second gaps in the mirror system using the subtractive manufacturing process, the second gaps extending completely through the gimbal and the mirror substrate in a second direction perpendicular to the first direction;
    wherein the first gaps and the second gaps separate the gimbal into a top portion and a bottom portion.

2. The method of claim 1, wherein the first gaps and the second gaps allow tip and tilt movement of the bottom portion of the gimbal and the mirror relative to the top portion of the gimbal.

3. The method of claim 2, wherein the tip and tilt movement is limited by thicknesses of the first and second gaps.

4. The method of claim 1, wherein forming the first gaps comprises:
    placing a subtractive manufacturing tool through a first void in the mirror system and moving the subtractive manufacturing tool along shapes of the first gaps, the first void extending through the gimbal and the mirror substrate in the first direction.

5. The method of claim 4, wherein forming the second gaps comprises:
    placing the subtractive manufacturing tool through a second void in the mirror system and moving the subtractive manufacturing tool along shapes of the second gaps, the second void extending through the gimbal and the mirror substrate in the second direction.

6. The method of claim 1, wherein the gimbal comprises multiple first flexure blades arranged substantially along a first line extending in the first direction and multiple second flexure blades arranged substantially along a second line extending in the second direction.

7. The method of claim 6, further comprising:
    changing at least one of a shape and a dimension of at least one of the first and second flexure blades using the subtractive manufacturing process.

8. The method of claim 1, wherein the subtractive manufacturing process comprises wire electrical discharge machining (EDM).

9. A mirror system comprising:
    a dual axis gimbal;
    a mirror; and
    a mirror substrate;
    wherein the gimbal, the mirror, and the mirror substrate comprise an integral component formed using an additive manufacturing process;
    wherein the mirror system includes multiple first gaps extending completely through the gimbal and the mirror substrate in a first direction and multiple second gaps extending completely through the gimbal and the mirror substrate in a second direction perpendicular to the first direction, the first and second gaps separating the gimbal into a top portion and a bottom portion; and
    wherein the first and second gaps are formed in the mirror system using a subtractive manufacturing process.

10. The mirror system of claim 9, wherein the first gaps and the second gaps are configured to enable tip and tilt movement of the bottom portion of the gimbal and the mirror relative to the top portion of the gimbal.

11. The mirror system of claim 10, wherein the tip and tilt movement is limited by thicknesses of the first and second gaps.

12. The mirror system of claim 9, further comprising:
    a first void extending through the gimbal and the mirror substrate in the first direction and configured to allow a subtractive manufacturing tool to be placed through the first void;
    wherein the first gaps are formed by movement of the subtractive manufacturing tool along shapes of the first gaps.

13. The mirror system of claim 12, further comprising:
    a second void extending through the gimbal and the mirror substrate in the second direction and configured to allow the subtractive manufacturing tool to be placed through the second void;

wherein the second gaps are formed by movement of the subtractive manufacturing tool along shapes of the second gaps.

14. The mirror system of claim 9, wherein the gimbal comprises multiple first flexure blades arranged substantially along a first line extending in the first direction and multiple second flexure blades arranged substantially along a second line extending in the second direction.

15. The mirror system of claim 14, wherein at least one of a shape and a dimension of at least one of the first and second flexure blades is changed using the subtractive manufacturing process.

16. The mirror system of claim 9, wherein the subtractive manufacturing process comprises wire electrical discharge machining (EDM).

17. A mirror system comprising:
a dual axis gimbal;
a mirror having a reflective surface; and
a mirror substrate having multiple recesses, the recesses configured to contain actuators for controlling movement of the gimbal;
wherein the gimbal, the mirror, and the mirror substrate comprise an integral component formed using an additive manufacturing process;
wherein the mirror system includes multiple first gaps extending completely through the gimbal and the mirror substrate in a first direction and multiple second gaps extending completely through the gimbal and the mirror substrate in a second direction perpendicular to the first direction, the first and second gaps separating the gimbal into a top portion and a bottom portion; and
wherein the first and second gaps are formed in the mirror system using a subtractive manufacturing process.

18. The mirror system of claim 17, wherein the first gaps and the second gaps are configured to enable tip and tilt movement of the bottom portion of the gimbal and the mirror relative to the top portion of the gimbal.

19. The mirror system of claim 18, wherein the tip and tilt movement is limited by thicknesses of the first and second gaps.

20. The mirror system of claim 17, further comprising:
a first void extending through the gimbal and the mirror substrate in the first direction and configured to allow a subtractive manufacturing tool to be placed through the first void; and
a second void extending through the gimbal and the mirror substrate in the second direction and configured to allow the subtractive manufacturing tool to be placed through the second void;
wherein the first and second gaps are formed by movement of the subtractive manufacturing tool along shapes of the gaps.

* * * * *